(12) United States Patent
Layous et al.

(10) Patent No.: US 7,175,870 B2
(45) Date of Patent: Feb. 13, 2007

(54) PROCESSED GARLIC PIECES

(75) Inventors: John Layous, Bakersfield, CA (US); Richard Gorski, Foster City, CA (US); Peter Mattson, Foster City, CA (US)

(73) Assignee: The Garlic Company, Bakersfield, CA (US)

( * ) Notice: Subject to any disclaimer, the term of this patent is extended or adjusted under 35 U.S.C. 154(b) by 65 days.

(21) Appl. No.: 10/753,255

(22) Filed: Jan. 8, 2004

(65) Prior Publication Data
US 2005/0153053 A1 Jul. 14, 2005

(51) Int. Cl.
*A23L 1/015* (2006.01)
*A23L 1/22* (2006.01)
*A23L 1/224* (2006.01)

(52) U.S. Cl. ............... 426/518; 426/520; 426/523; 426/615; 426/638

(58) Field of Classification Search ............... 426/518, 426/520, 523, 615, 638
See application file for complete search history.

(56) References Cited

U.S. PATENT DOCUMENTS 3,082,310 A * 3/1963 Sakamoto .............. 219/407

FOREIGN PATENT DOCUMENTS

JP 59216565 A * 5/1983

OTHER PUBLICATIONS

Rombauer, I. 1975 Joy of Cooking, The Bobbs-Merrill Co., Inc. NY, p. 584.*

* cited by examiner

*Primary Examiner*—Helen Pratt
(74) *Attorney, Agent, or Firm*—H. Michael Brucker

(57) ABSTRACT

A form of garlic and process for making same in which cloves of garlic are cut into bits, blanched or baked to reduce the strength of the garlic flavor and bitterness, and then fried to produce ready-to-use, crunchy, roasted flavor garlic pieces that can be conveniently stored and dispensed from a shaker.

5 Claims, 1 Drawing Sheet

PROCESSED GARLIC PIECES

BACKGROUND OF THE INVENTION

The present invention relates to food flavoring products and processes and, in particular, to a garlic product and process for making same.

Garlic has been used to flavor and enhance the taste of food for centuries and, relatively recently, science has shown what ancients intuitively knew: garlic contains high concentrations of health-giving ingredients.

Raw garlic, crushed garlic, cooked garlic, garlic salt, garlic powder, freeze-dried garlic and powdered garlic in capsules are but a few of the many forms in which garlic is commercially available.

Untreated raw garlic and certain forms of processed garlic have a bitterness and garlic flavor so strong that they are unpalatable to all but a relative few. For this reason, garlic is customarily cooked in some manner before being used with food. The traditional process required for preparing garlic for cooking and the cooking itself can be tedious and time-consuming.

DEFINITIONS

As used herein, the term "process-ready cloves" refers to washed and skinned cloves of garlic.

As used herein, the term "garlic bits" or "bits" refers to the form of garlic that results from cutting process-ready cloves into smaller pieces of generally uniform thickness.

As used herein with reference to bitterness and strength of garlic flavor in garlic bits, the term "reduced" means less than existed prior to garlic bits having been subjected to a reducing process.

As used herein, "garlic pieces" and "pieces" refer to garlic bits of reduced strength of garlic flavor and bitterness that have been fried.

BRIEF DESCRIPTION OF THE INVENTION

The present invention provides ready-to-use garlic in the form of palatable, crispy, roasted-flavor pieces that can conveniently be stored and dispensed from a shaker. The garlic pieces of the present invention can be dispensed directly from a shaker onto food, either during or after its preparation, to lend the savory flavor of garlic.

When introduced into mashed potatoes, for example, the mashed potatoes are immediately imbued with the roasted flavor of toasted garlic with the added feature of lightly crunchy morsels. The same is true for salads, meat, poultry, fish and any other food with which garlic flavoring is desired.

In the present invention, garlic is processed into crispy pieces that not only provide a source of roasted garlic flavor to any food to which they are added, but also add nuggets of light crunchiness. During the process of the present invention, the strength of the raw garlic flavor is reduced to make the pieces more widely palatable. In addition, the bitterness which is a characteristic of raw garlic is also reduced below the level at which it is undesirable. In the present invention, both modifications to the palatability of the raw garlic are carried out without the use of leaching chemicals or unnatural additives. One end product of the present invention is garlic, with no additives other than the oil in which it is fried, in the form of crispy pieces with a roasted flavor that is palatable to a wide audience and that can be conveniently dispensed from a shaker. Another end product of the invention is garlic bits having reduced strength of garlic flavor and bitterness.

Accordingly, it is an object of the present invention to provide widely palatable, crispy pieces of roasted-flavor garlic ready for immediate use without further processing.

It is another object of the present invention to provide crispy pieces of garlic that have reduced bitterness and/or strength of garlic flavor.

It is yet another object of the present invention to provide a process for making crispy pieces of garlic from which the natural bitterness of the garlic has been reduced.

It is a further object of the present invention to provide a process for making crispy pieces of roasted-flavor garlic in which the strength of the flavor of the raw garlic has been reduced.

Another object of the present invention is to provide bits of garlic with reduced strength of garlic flavor and reduced bitterness.

The foregoing and other objectives, features and advantages of the invention will be more readily understood upon consideration of the following detailed description of the invention taken in conjunction with the accompanying drawing.

DETAILED DESCRIPTION OF THE PREFERRED EMBODIMENTS

Figure 1:
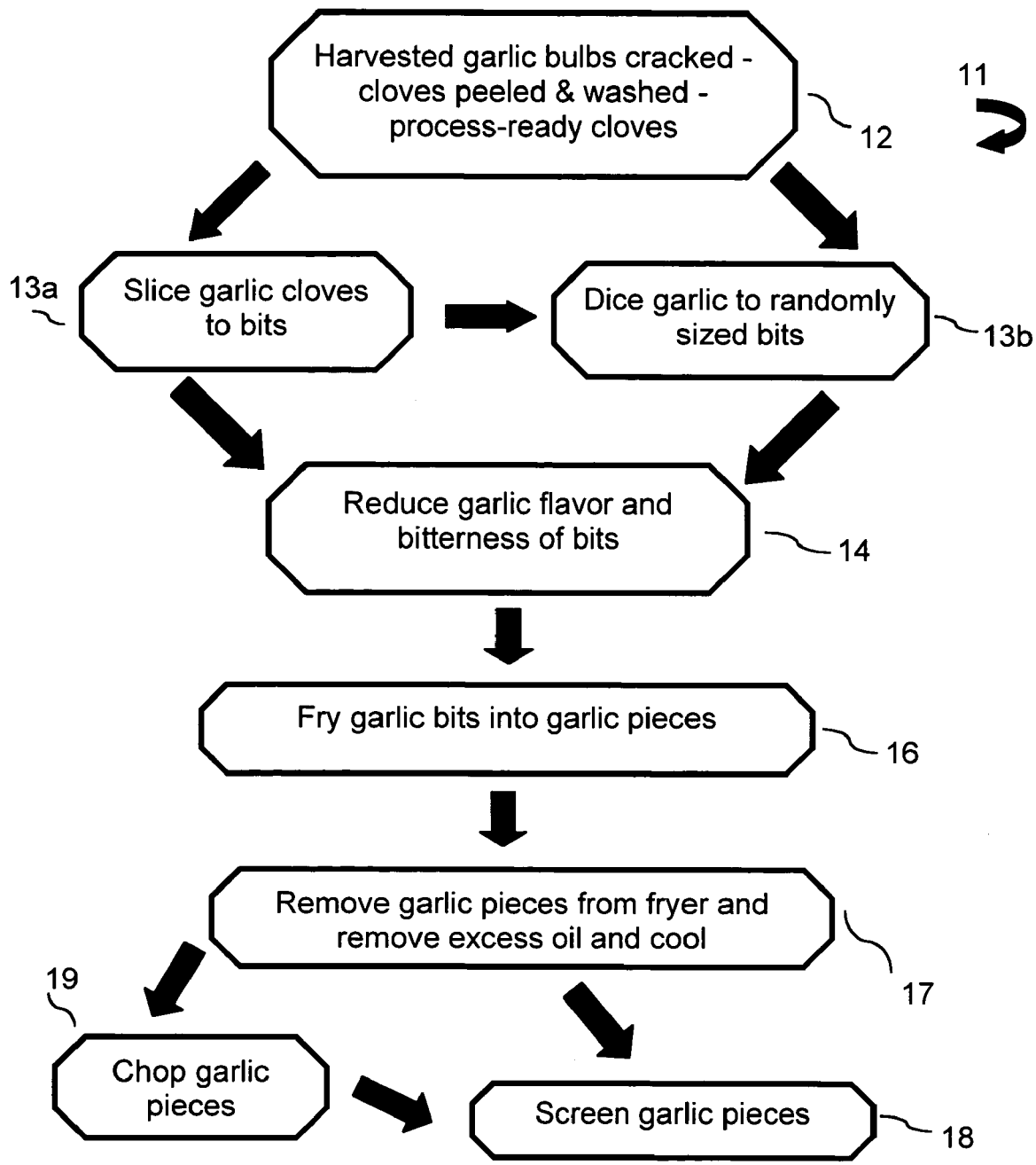
FIG. 1 is a flow chart schematically illustrating preferred embodiments of the process of the invention for making the products of the invention.

The basic steps in the process of one embodiment of the present invention include: (1) cracking harvested garlic bulbs into individual cloves that are then peeled and washed (process-ready cloves); (2) slicing and/or dicing the peeled and washed cloves into garlic bits of generally similar thickness; (3) reducing the bitterness and strength of the garlic flavor from the bits; and (4) frying the reduced bits into garlic pieces.

Referring to FIG. 1, process 11 is initiated by step 12 which transforms harvested bulbs of garlic into skinned and washed garlic cloves. In ways known to those skilled in the art, the harvested garlic bulbs are cracked into individual cloves and the bulb's outer skins and root crowns removed. An air process can be used to remove the skins from the individual cloves, leaving skinned cloves which are then washed. Cloves with obvious defects are discarded.

In step 13a, the process-ready cloves are cut into bits of a desired thickness as by a slicer. While the thickness can vary depending on the desired shape and size of the final product, pieces cut to a thickness of between approximately one-sixteenth and three-sixteenths of an inch have been found to produce excellent results. Regardless of the thickness selected, the best results are achieved when the bits have a generally uniform thickness so that later processing of the bits has a uniform effect. It will be understood by those skilled in the art that "generally uniform thickness" as used with reference to sliced garlic cloves can include variations within a range that still produces generally uniform results.

By step 13b, the garlic is diced. Process-ready cloves from step 12 or sliced bits from step 13a can be fed to a dicer where they are chopped into smaller size bits. Thus, in one embodiment of the invention, bits are formed by step 13a alone. In yet another embodiment, process step 13b follows process step 13a. In yet another embodiment, process step 13b follows step 12 and step 13a is not employed. In all of the embodiments, however, garlic bits of generally uniform thickness result.

Slicing and dicing garlic cloves is known to those skilled in the art, as is the equipment for doing so and, thus, need not be described in further detail herein.

The garlic bits produced by step 13a and/or step 13b are then processed by step 14 in which the strength of the garlic flavor and the bitterness of the raw garlic bits are reduced. Because the bits have a generally uniform thickness, the reducing step will have a uniform effect on all of the bits.

In one embodiment of the invention, process step 14 is performed by blanching the garlic bits with heated water. The garlic bits can be blanched by immersion in a vat of heated water or by being carried on a conveyor where heated water is applied to the garlic bits. When immersed in a vat of heated water, the bits are retained in water at a temperature from approximately 170 to 195 degrees F. for 30 to 120 seconds. In some instances, boiling water can be used. Because garlic can vary in flavor strength and bitterness, depending on a number of factors including the season when they are harvested, the time between harvesting and processing and the variety of garlic, the optimal time and temperature will vary.

When blanching by applying heated water to garlic bits on a conveyor, the several variables mentioned above will dictate how long the bits are exposed to the heated water. In most cases, 30 to 120 seconds will suffice.

In another embodiment of the invention, step 14 is carried out by applying steam to the bits for 10 to 120 seconds.

Before being fried by step 16, it is advantageous for the blanched garlic bits to be dried to remove any water remaining from the blanching process. This can be accomplished by exposure to ambient conditions for a few minutes, the use of warm air applied to the blanched garlic bits, shaking the garlic bits or any other method effective to remove moisture remaining from the reducing step 14.

In another embodiment of the invention, step 14 reducing the bitterness and strength of the garlic flavor of the raw garlic bits is performed by baking rather than blanching. In this embodiment, garlic bits are placed on a conveyor that travels through an oven where the garlic bits are exposed to heat in the range of 200 to 600 degrees F. for a time period of 10 to 180 seconds. The particular temperature and time will depend on the factors mentioned above, as well as the desired characteristics of the finished product. For most applications, the baking process will not remove all of the moisture from the bits.

Because the bits have been formed to have a generally uniform thickness, the reducing step 14, whether by blanching or baking, will operate generally uniformly on all of the bits to produce bits having substantially the same strength of garlic flavor and reduced bitterness. If, by contrast, the blanching process is applied to whole, process-ready cloves before they are formed into bits of generally uniform thickness, two adverse effects have been observed. Cloves, even from the same bulb, vary so much in size that blanching or baking them for the same time and temperature results in widely varying degrees of effectiveness in reducing the bitterness and the strength of garlic flavor. Also, in order to penetrate to the center of the cloves, the process would have to be carried out for so long and/or at such an elevated temperature that the outer portions of the cloves would be structurally broken down into a pulpy mass that could not be readily sliced and/or diced.

After step 14, the garlic bits can be processed by step 16 in which they are fried. Frying the garlic bits transforms them into crispy, roasted-flavor pieces of garlic that are ready to use.

The following are two methods for carrying out step 16. In one embodiment of the invention, garlic bits are placed in cooking oil at between 300 and 400 degrees F. The bits are left in the oil for 30 seconds to two and one-half minutes, depending on the size of the bits, the temperature of the oil, the degree of crispiness desired and the amount of roasted-flavor desired. In one embodiment, the bits are fried in oil at approximately 340 degrees F. for about one minute.

The oil used can be any oil typically used to fry foods. Safflower oil has the advantages of economy, a near neutral flavor and low absorption. Olive oil can add a more complex flavor. Other vegetable oils used for frying foods can also be used.

In another embodiment, step 16 is performed by applying frying oil to garlic bits while they are transported on a conveyor. The time that the frying oil is applied to the garlic bits will depend on such variables as the temperature of the oil, the size of the garlic bits, the degree of crispiness desired and the strength of roasted-flavor desired. In one embodiment, the garlic bits are exposed to the frying oil at between 300 and 400 degrees F. for 30 to 180 seconds, and preferably 340 degrees F. for 60 seconds.

In step 17, any excess oil on the garlic bits is drained away and the bits cooled to room temperature. This step can be carried out by transporting the bits from the fryer on a three-layered belt chamber where the bits pass back and forth, removing excess oil and drying. The bits can then be conveyed into a cooling tunnel where ambient temperature air is blown on the bits to further cool and dry them.

In step 18, the fried garlic bits can be sized by passing them through a screen of a selected size.

In an alternative embodiment, step 13a is performed to create garlic bits that are slices of process-ready cloves of a selected thickness (e.g., one-eighth of an inch). These slices are processed by steps 14, 16 and 17 as described above to create fried, crispy, roasted-flavor garlic pieces. Before these garlic pieces are sized by step 18, however, step 19 is performed in which the fried garlic slices (pieces) are chopped into smaller random-size garlic pieces.

Of course, various changes, modifications and alterations in the teachings of the present invention may be contemplated by those skilled in the art without departing from the intended spirit and scope thereof. As such, it is intended that the present invention only be limited by the terms of the appended claims.

What is claimed is:

1. A process for making garlic pieces that are generally uniform in thickness, derived from cloves of raw garlic of different sizes, are crispy and crunchy, have a roasted garlic flavor, which can be stored and dispensed from a shaker and which imbue foods to which they are applied with a roasted garlic flavor, and wherein the garlic pieces have a garlic flavor that is generally uniformly less than the garlic flavor of the raw garlic from which the pieces were derived so as to make the pieces more widely palatable, comprising:

slicing process-ready garlic cloves having an inner section surrounded by an outer section into garlic slices of generally uniform thickness whereby the inner and outer sections of each clove of garlic are substantially equally exposed; then reducing the strength of the garlic flavor of the garlic slices whereby the garlic slices of generally uniform thickness have their strength of garlic flavor reduced generally uniformly; and then frying the reduced flavor garlic slices until they are crispy and crunchy garlic pieces that have a generally uniform roasted garlic flavor which can be stored and dispensed from a shaker and which imbue foods to which they are applied with garlic flavor.

2. The process of claim 1 wherein the reducing step is performed by blanching with hot water.

3. The process of claim 1 wherein the reducing step is performed by baking.

4. The process of claim 1 wherein the slicing step produces slices of garlic between approximately 1/16 and 3/16 of an inch thick.

5. A commercial garlic seasoning product derived from raw garlic cloves of differing sizes comprising generally crispy and crunchy, uniformly thick pieces of garlic having a roasted garlic flavor that has been reduced below that of the raw garlic from which the seasoning is made and below that of garlic that is only fried, wherein said garlic seasoning has been produced by:

slicing process-ready garlic cloves of different sizes having inner sections surrounded by outer sections into garlic slices of generally uniform thickness whereby the inner and outer sections of each clove of garlic are substantially equally exposed regardless of the original size of the garlic clove; then reducing the strength of the garlic flavor of the garlic slices whereby the garlic slices of generally uniform thickness have their strength of garlic flavor reduced generally uniformly; and then frying the reduced flavor garlic slices until they are crispy and crunchy garlic pieces that can be stored and dispensed from a shaker and which have a generally uniform roasted garlic flavor that imbues foods to which they are applied with a roasted garlic flavor.

* * * * *